UNITED STATES PATENT OFFICE.

JOHN WELSH, OF GREEN BAY, WISCONSIN.

PROCESS FOR REMOVING INK OR COLORING-MATTER FROM PAPER.

1,175,853.      Specification of Letters Patent.      Patented Mar. 14, 1916.

No Drawing.      Application filed March 31, 1915. Serial No. 18,342.

*To all whom it may concern:*

Be it known that I, JOHN WELSH, a citizen of the United States of America, residing at Green Bay, in the county of Brown and State of Wisconsin, have invented certain new and useful Improvements in the Process for Removing Ink or Coloring-Matter from Paper, of which the following is a specification.

My invention relates to manufacture of paper, and consists of the hereinafter described process for the recovery of pulp from printed or written waste paper, whereby also so-called mechanical wood pulp, that may be contained therein, is recovered without impairing its color, or physical qualities, and in a condition suitable for use in the manufacture of the same grade of paper.

The main object of my invention is to use a heretofore waste product for removing the ink or coloring matter from printed waste papers, such as old newspapers, book paper, etc., without harming or discoloring the fibers thereof, so that the latter can be repulped and made again into white paper at a cost of very much less than by the processes heretofore known.

A further object of my invention is to provide a process that will remove the ink or coloring matter from waste paper without regard to the temperature of the solvent used in the process.

A still further object of my invention is to provide a process whereby the ink or coloring matter in the paper may be removed in a very much shorter time than by the processes heretofore known.

According to the known processes for the recovery of pulp from printed waste paper, described in the literature and Letters Patent relating to the art, the paper is first carefully cut up and usually placed in vats containing specially prepared solvents to dissolve or saponify the oily constituents of the printers' ink. Some give directions to boil such waste papers in the stated solvent, or to subject them to the action of such solvents heated by steam under pressure. Raw wood fibers which compose the so-called mechanical pulp become discolored when subjected to heat, the more concentrated or the hotter the solvent employed, and the larger proportion of the mechanical wood pulp contained in the waste paper, the more pronounced is the discoloring effect upon all the pulp recovered.

Another disadvantage of the solvents or processes known and described, is that considerable time is required in freeing the ink, usually 10 hours or more, and when bleaching is involved, as high as 36 hours are necessary for saturating, cooking, washing, bleaching and rewashing.

My improved process obviates all these disadvantages and produces pulp which is as white as the original, and which retains all of its adhesive qualities, so that paper prepared from it is as strong and durable as that prepared with freshly made pulp. By my process one hour or more washing is all the time required to prepare the pulp in a condition fit to be remade into white paper.

In preparing chemical pulp, wood that has been reduced to chips is conveyed to a digester where it is acted upon by either a sulfurous or an alkaline solution for about eight hours, the liquor is then drawn off and heretofore has been disposed of as a waste product. These spent or waste digester liquors have been found to be very detrimental to land, and if they are disposed of through the sewer, they have been found to be detrimental to fish, the effects of the liquors being such as to cause proposed laws requiring the evaporating and burning of the solutions. These spent digester liquors are of a very solvent nature, and I have discovered that by subjecting waste print paper, either in a pulped state or in the whole, to the action of either of these spent digester liquors, under any temperature, for the space of one hour or more, then washing the pulp with fresh water, all ink or coloring matter that may be in the paper will be entirely removed, and without discoloring the fibers of the mechanical wood pulp, leaving the same fit to be remade into white paper. If the waste paper be first pulped, it may be charged into a beater vat filled with either of these spent digester liquors and by the action of the beating engine, all ink or coloring matter will be entirely freed from the pulp, the solvent may then be drained off and the pulp washed in fresh water, leaving the same in a state to be remade into white paper.

As stated above, I am aware of the several methods or processes heretofore known and described for removing ink or coloring matter from waste papers by the use of specially prepared solvents, but I am not aware of any one using either of these spent digester liquors for that purpose, therefore I desire to claim that broadly.

What I claim is:

1. The process of removing ink, coloring matter or pigments from waste papers by the use of spent digester liquids, or the equivalent of such waste digester liquids.

2. The process of recovering all pulp from waste papers, made partly of mechanical wood pulp, consists of the following steps: (1) pulping the waste papers; (2) subjecting the pulp to the action of spent digester liquids under any temperature; (3) draining and washing the material in fresh water; (4) separating the pulp fibers from the impurities and collecting the clean pulp, substantially as set forth.

3. The process of recovering all pulp from waste print papers, made partly of mechanical wood pulp, consists of the following steps: (1) subjecting the waste papers to the action of spent digester liquids under any temperature; (2) draining and washing the material in fresh water, substantially as set forth.

In testimony whereof I hereunto affix my signature in presence of two witnesses.

JOHN WELSH.

Witnesses:
FRANK T. RAMSEY,
E. F. BOND.